(12) United States Patent
Shirasaki

(10) Patent No.: US 6,175,181 B1
(45) Date of Patent: Jan. 16, 2001

(54) VIBRATION DRIVEN MOTOR

(75) Inventor: Takayuki Shirasaki, Yokohama (JP)

(73) Assignee: Canon Kabushiki Kaisha, Tokyo (JP)

( * ) Notice: Under 35 U.S.C. 154(b), the term of this patent shall be extended for 0 days.

This patent is subject to a terminal disclaimer.

(21) Appl. No.: 08/387,293

(22) Filed: Feb. 10, 1995

Related U.S. Application Data

(63) Continuation of application No. 07/975,017, filed on Nov. 12, 1992, now Pat. No. 5,406,160.

(30) Foreign Application Priority Data

Nov. 12, 1991 (JP) .................................... 3-295761

(51) Int. Cl.$^7$ .................................................. H01L 41/08
(52) U.S. Cl. .............................. 310/323.04; 310/323.06
(58) Field of Search .................................... 310/323, 328, 310/323.04, 323.06

(56) References Cited

U.S. PATENT DOCUMENTS

| | | | |
|---|---|---|---|
| 4,580,073 | * | 4/1986 | Okumura et al. .................. 310/323 |
| 4,771,203 | * | 9/1988 | Mukohjima et al. .............. 310/323 |
| 5,001,404 | * | 3/1991 | Kataska ............................ 318/116 |
| 5,034,646 | | 7/1991 | Shirasaki .......................... 310/323 |
| 5,134,333 | * | 7/1992 | Atsuta .............................. 310/323 |
| 5,134,348 | * | 7/1992 | Izukawa et al. .................. 310/323 |
| 5,148,075 | | 9/1992 | Shirasaki .......................... 310/323 |
| 5,198,714 | * | 3/1993 | Salomon et al. .................. 310/323 |
| 5,352,950 | | 10/1994 | Shirasaki .......................... 310/323 |
| 5,406,160 | * | 4/1995 | Shirasaki .......................... 310/323 |

FOREIGN PATENT DOCUMENTS

| | | |
|---|---|---|
| 61-157276 | 7/1986 | (JP) . |
| 64-12881 | 1/1989 | (JP) . |

* cited by examiner

*Primary Examiner*—Mark O. Budd
(74) *Attorney, Agent, or Firm*—Fitzpatrick, Cella, Harper & Scinto

(57) ABSTRACT

2n (n is an integer) projections are formed per half wavelength on the driving surface of a vibration member of a disclosed vibration driven motor. The vibration member has an A driving electrode group ($A_1$ to $A_8$) and a B driving electrode group ($B_1$ to $B_8$) polarized at a $\lambda/2$ pitch so as to alternately have opposing expansion/contraction polarities with respect to a wavelength $\lambda$ of a vibration wave to be excited, and $\lambda/4$-pitch vibration detection electrodes ($S_A$, $S_B$) and three ground common electrodes (G), which are arranged between the A and B electrode groups. The vibration detection electrodes ($S_A$, $S_B$) are arranged to have substantially loop positions of standing waves generated by the corresponding A and B driving electrode groups as their centers.

5 Claims, 4 Drawing Sheets

VIBRATION DRIVEN MOTOR

This application is a continuation of application Ser. No. 07/975,017 filed Nov. 12, 1992 now U.S. Pat. No. 5,406,160.

BACKGROUND OF THE INVENTION

1. Field of the Invention

The present invention relates to a vibration driven motor for generating a travelling vibration wave on a vibration member by applying a voltage to an electromechanical energy conversion element, and for causing a relative movement between the vibration member and a member contacting the vibration member by frictional driving and, more particularly, to a high-precision type vibration driven motor.

2. Related Background Art

FIG. 4A is a plan view showing an electrode arrangement of a conventional vibration driven motor, and FIG. 4B is an exploded side view of a stator. As shown in FIGS. 4A and 4B, a common electrode surface of a thin annular electromechanical energy conversion element (e.g., a piezo-electric element) 101 is fixed to a vibration member 102 formed of an elastic member so as to constitute a stator. Projections for increasing the moving speed of a movable member and improving driving efficiency are arranged on the contact surface of the vibration member 102 with the movable member at equal intervals over the entire periphery at a rate of a plurality of projections per $\lambda/2$. Note that $\lambda$ is the wavelength of a vibration generated on the vibration member 102.

Electrodes on the other surface of the piezo-electric element 101 include an A driving electrode group ($A_1$ to $A_8$) and a B driving electrode group ($B_1$ to $B_8$) polarized at a $\lambda/2$ pitch so as to alternately have opposing expansion/contraction polarities with respect to the wavelength ($\lambda$) of a vibration wave to be excited, and a $\lambda/4$-pitch vibration detection electrode S and two power supply ground electrodes G arranged between the A and B electrode groups.

When an AC voltage is applied to one of the A or B electrode groups, a standing wave having the wavelength $\lambda$, in which the central point of the electrode group and points separated from the central point at $\lambda/2$ intervals correspond to loop positions, and the central points of the loop positions correspond to node positions, is generated over the entire periphery of the vibration member 102. When an AC voltage is applied to only the other electrode group, a standing wave is similarly generated. In this case, the loop and node positions are shifted by $\lambda/4$ from the above-mentioned standing wave.

When AC voltages having the same frequency and a time phase difference=$\pi/2$ therebetween are simultaneously applied to the two electrode groups, two standing waves generated by the two groups are synthesized, and a progressive wave having the wavelength $\lambda$ of a flexural vibration propagating in the circumferential direction is generated on the vibration member 102. Thus, the distal ends of the projections, i.e., the contact surface of the vibration member 102 with the movable member drives a known movable member (not shown in FIGS. 4A and 4B) urged thereagainst.

In this conventional vibration driven motor, a driving circuit, in which one vibration detection electrode S is arranged in addition to the A and B driving electrode groups, and the frequency of the AC voltages to be applied to the driving electrode groups is automatically set to be a resonance frequency according to the detection output, thereby efficiently driving the vibration driven motor, is disclosed in Japanese Laid-Open Patent Application No. 61-157276.

Note that the positional relationship of the plurality of projections (five projections in FIG. 4B) per $\lambda/2$ of the vibration member 102 is not specified with respect to the electrode arrangement of the piezo-electric element 101 shown in FIG. 4B.

A vibration driven motor assembled with the conventional stator has high-output type performance, i.e., a rated rotation speed of 100 rpm, a torque of 4 kg·cm, and a rated output of 4 W or more. When this vibration driven motor was driven by a low output, e.g., at a rotation speed of 33.33 rpm and a torque of 1 kg·cm, required rotation nonuniformity precision, i.e., a required wow & flutter value of rotation could not be obtained, and it was found that rotation precision must be considerably improved.

It was also found that rotation precision varies depending on rotation directions.

Furthermore, it was confirmed that rotation precision varies depending on a difference in individual stators.

SUMMARY OF THE INVENTION

It is an aspect of the present invention to provide a high-precision type vibration driven motor by re-examining an electrode arrangement of a piezo-electric element constituting a stator and projections of a vibration member to find out an optimal condition of the stator, and improving driving efficiency, improving stability of precision, or attaining uniform precision.

According to one aspect of the present invention, when the wavelength of a vibration wave to be excited is represented by $\lambda$, projections, the number per $\lambda/2$ of which is set to be an integer multiple of 2 (i.e., 2, 4, 6, 8, . . . ), are provided to increase the moving speed of the movable member, and to improve driving efficiency, and the projections are arranged at equal intervals or at substantially equal intervals over the entire periphery of the contact surface of the vibration member.

Electrodes of a thin annular piezo-electric element constituting the stator include two driving electrode groups polarized at a $\lambda/2$ pitch so as to alternately have opposing expansion/contraction polarities, two vibration detection electrodes respectively arranged at loop positions of standing waves generated by the driving electrode groups, and three ground electrodes for power supply.

The vibration member and the piezo-electric element constituting the stator are fixed in such a manner that the central positions of the two vibration detection electrodes coincide with each other with respect to an intermediate position between the projections of the vibration member or a position near the intermediate position.

Other aspects of the present invention will become apparent from the following detailed description of the present invention.

DESCRIPTION OF THE PREFERRED EMBODIMENT

Figure 1A:
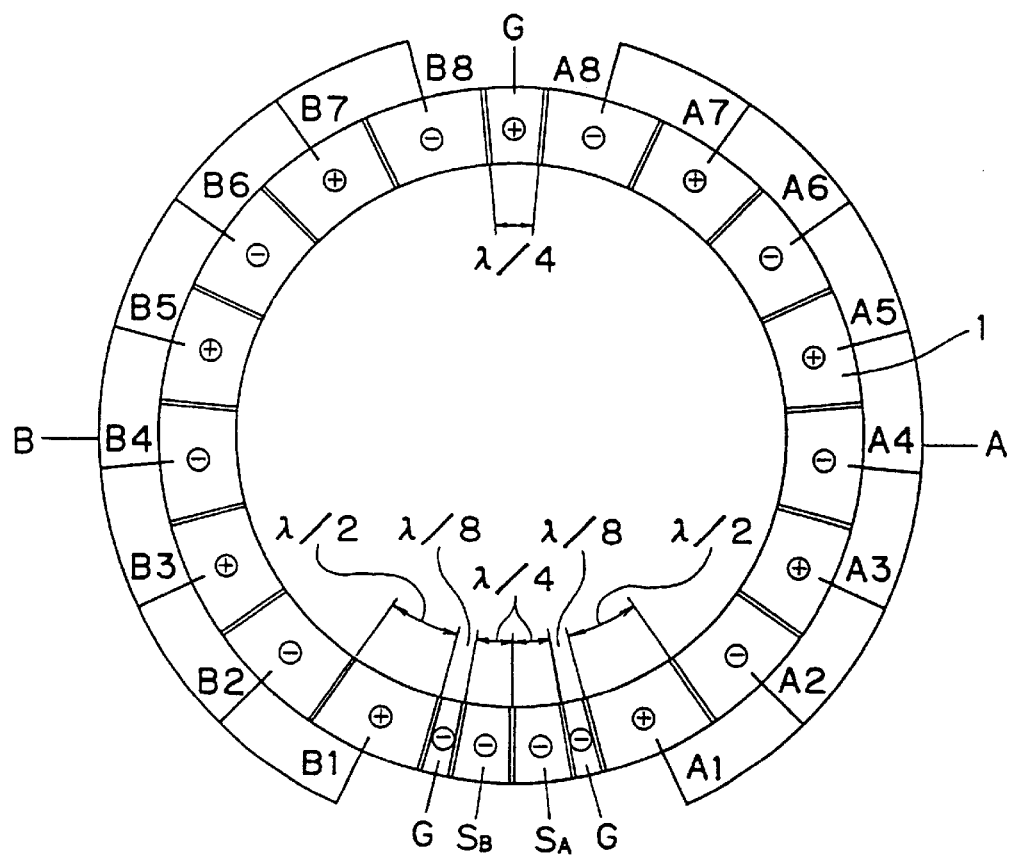
FIGS. 1A and 1B are respectively a plan view showing an electrode arrangement of a piezo-electric element of a vibration driven motor according to one embodiment of the present invention, and an exploded side view on a vibration member.
Figure 1B:
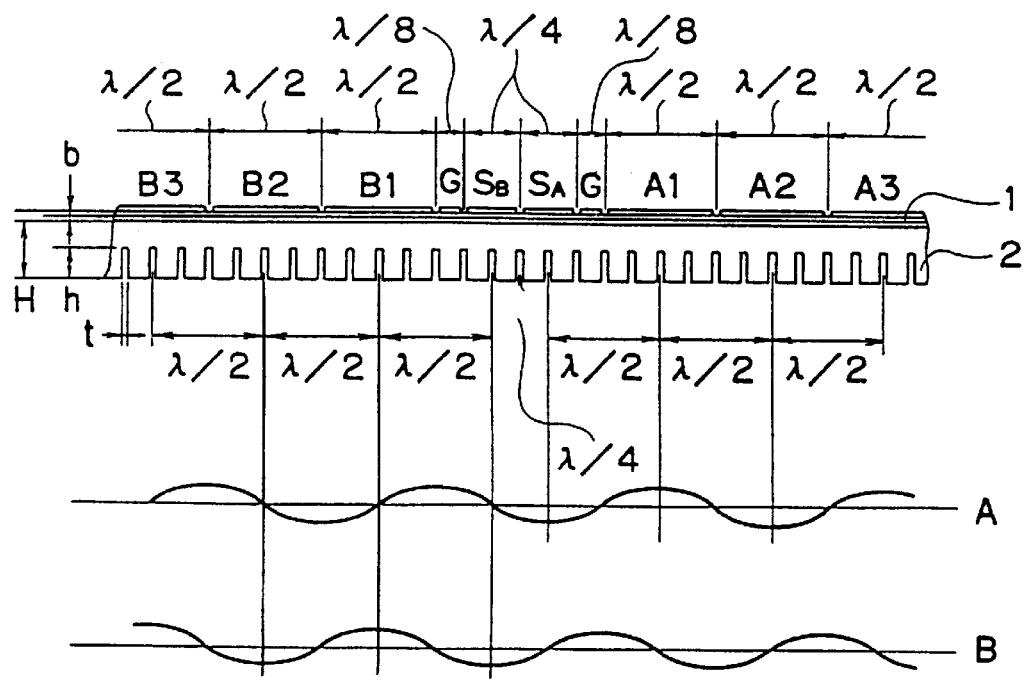

FIGS. 1A and 1B show a vibration driven motor according to the present invention. FIG. 1A is a plan view showing an electrode arrangement, and FIG. 1B is an exploded side view of a stator constituted by a vibration member 2 and a piezo-electric element 1.

A common electrode surface of the thin annular piezo-electric element 1 is fixed to the vibration member 2 formed of an elastic member, and having projections (four projections per $\lambda/2$) at equal intervals or at substantially equal intervals on its entire periphery so as to constitute a stator. As shown in FIG. 1A, an electrode arrangement on the other surface of the piezo-electric element includes an A driving electrode group ($A_1$ to $A_8$) and a B driving electrode group ($B_1$ to $B_8$) polarized at a $\lambda/2$ pitch so as to alternately have opposing expansion/contraction polarities with respect to a wavelength $\lambda$ of a vibration wave to be excited, and $\lambda/4$-pitch vibration detection electrodes $S_A$ and $S_B$ (for detecting vibration states of the corresponding electrode groups) and three ground common electrodes G arranged between the A and B electrode groups.

The B driving electrode group ($B_1$ to $B_8$) is arranged at a pitch shifted from that of the A driving electrode group ($A_1$ to $A_8$) by an odd number multiple of $\lambda/4$ ($3\lambda/4$ in this embodiment).

The vibration detection electrodes $S_A$ and $S_B$ are arranged to have substantially loop positions of standing waves generated by the A and B driving electrode groups as their centers.

In FIG. 1B, the projections of the vibration member 2 which is formed of an elastic member, and the number per $\lambda/2$ of which is set to be an integer multiple of 2, are arranged at equal intervals or at substantially equal intervals on the entire periphery by forming slits each having a predetermined width (t) with respect to the axial center. Note that H is the total height of the vibration member, and h is the slit depth.

Furthermore, as shown in FIG. 1B, the piezo-electric element 1 is fixed to the vibration member 2 such that the central points of the vibration detection electrodes $S_A$ and $S_B$ of the piezo-electric element 1 coincide with central points of slits defining the projections of the vibration member 2, thereby constituting the stator. Consequently, all the central points of electrodes $A_1$ to $A_8$ of the A driving electrode group, or of electrodes $B_1$ to $B_8$ of the B driving electrode group coincide with central points of slits forming the projections.

Figure 2:
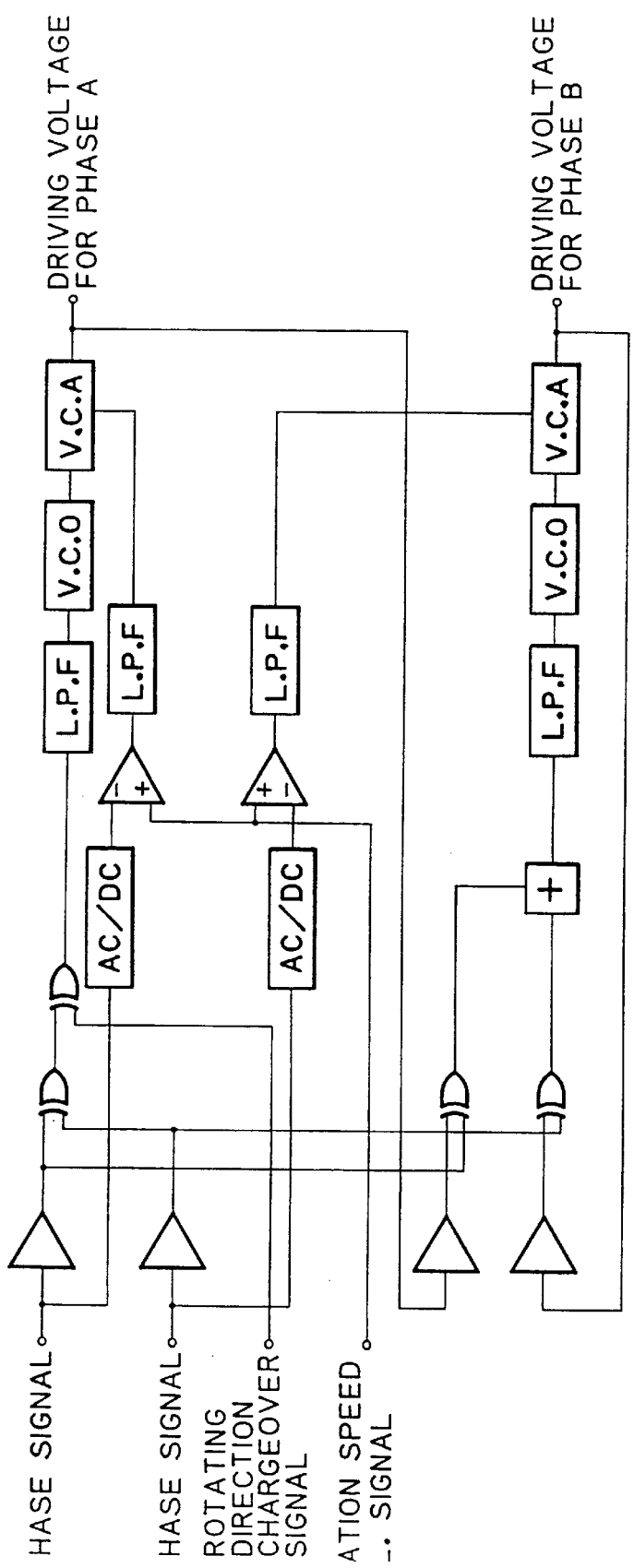
FIG. 2 is a circuit diagram showing a driving circuit of the vibration driven motor.

FIG. 2 shows a known driving circuit disclosed in, e.g., Japanese Laid-Open Patent Application No. 64-12881, which sets equal amplitudes of detection voltages from the vibration detection electrodes $S_A$ and $S_B$, and sets a time phase difference between the two detection voltages to be $\pi/2$. A detailed description of this circuit will be omitted.

Figure 3:
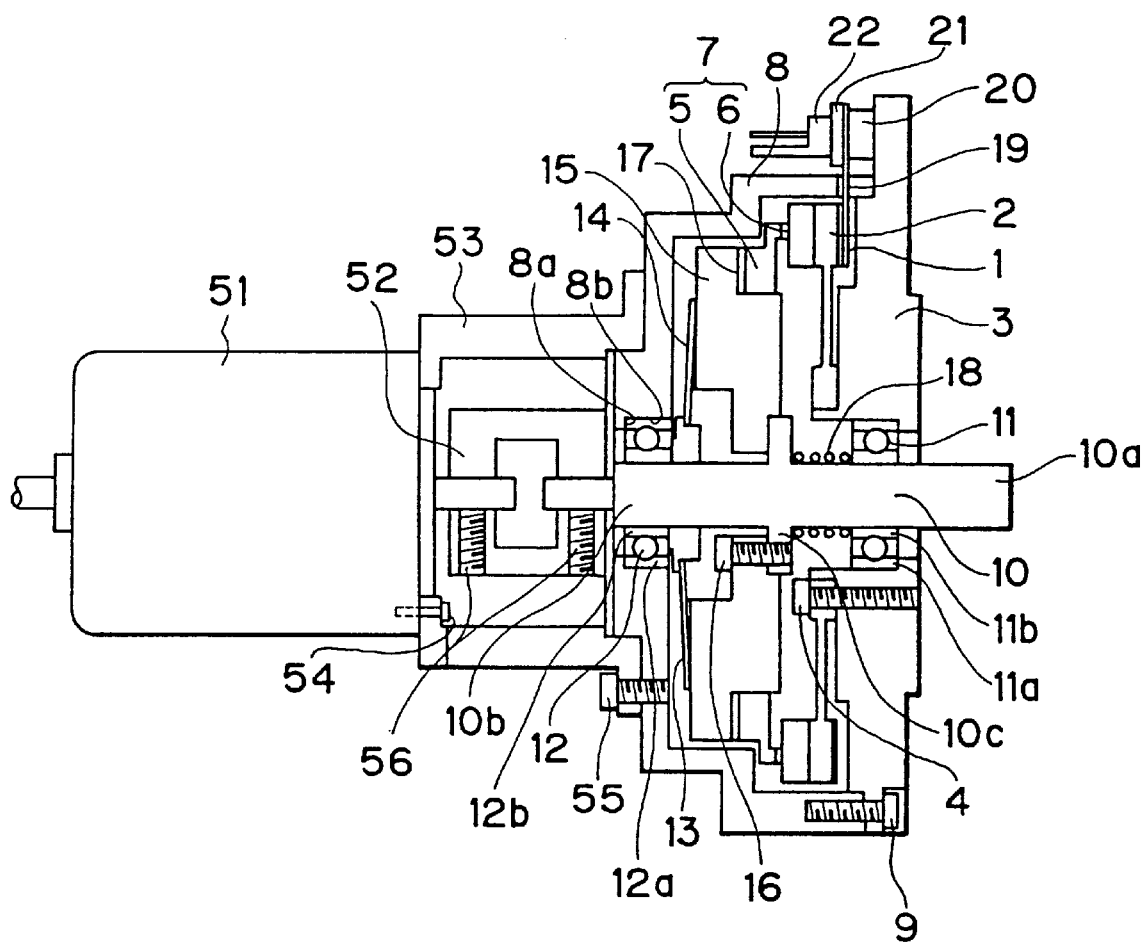
FIG. 3 is a longitudinal sectional view showing the vibration driven motor according to the embodiment.

FIG. 3 is a longitudinal sectional view showing an embodiment of a vibration driven motor using the stator shown in FIGS. 1A and 1B. The vibration member 2 is formed of, e.g., martensite-based stainless steel, and a hardening-treated film formed of tungsten carbide and cobalt is formed on the distal end of each projection portion serving as a contact surface with a movable member 7.

The piezo-electric element 1 is concentrically fixed to the back surface of the vibration member 2 by a heat-resistant epoxy resin-based adhesive, such that the electrode arrangement positions are specified with respect to the projection positions of the vibration member 2, as described above. A casing 3 is formed of a metal member having high thermal conductivity, and is provided with a first ball bearing 11 at its central portion. The vibration member 2 is fixed by a screw 4 to be concentrica with the center axis of the first ball bearing 11. An output shaft 10 is formed with a central flange portion 10c. One end portion 10a of the output shaft 10 extends through and is supported by an inner ring of the first ball bearing 11 to be slidable in the axial direction. The other end portion 10b of the output shaft 10 rotatably extends through an inner ring of a second ball bearing 12 (to be described later) and an axial hole of a casing cover 8 (to be described later) so as to be slidable in the axial direction. A disk-like intermediate member 15 is fixed to the flange portion 10c of the output shaft 10 by a screw 16. The ring-like movable member 7 is concentrically fitted on and fixed to the outer peripheral edge portion of the intermediate member 15.

The movable member 7 is constituted by a ring-like support member 5 formed of a metal such as an aluminum alloy having high thermal conductivity, and a slide member 6 concentrically adhered to the surface of the support member 6 by a heat-resistant epoxy-based adhesive. In this embodiment, the slide member 6 is formed as a 1-mm thick ring-like body, i.e., as a composite resin layer having a specific composition and structure (to be described later). The slide member 6 is in sliding contact with the slide surface of the vibration member 2.

The movable member 7 is supported by the intermediate member 15 via an elastic seat member 17 provided at its bottom portion. An axial load generated by a planar compression spring member 14 elastically inserted between the flange portion 10c of the output shaft 10 and the second ball bearing 12 is applied in the axial direction of the support member 5 through the elastic seat member 17, so that the slide surface of the vibration member 2 contacts the slide member 6 of the movable member 7 under pressure.

The casing cover 8 of the vibration driven motor is fixed to the casing 3 by a screw 9. The second ball bearing 12 is fitted in a bearing fitting hole 8b formed at the central portion of the casing cover 8 to be slidable in the axial direction. An outer ring 12a of the second ball bearing 12 contacts a flange 8a of the casing cover 8, and an inner ring 12b thereof is provided to be axially slidable and rotatable with respect to the output shaft 10.

Normally, an outer ring 11a of the first ball bearing 11 and the outer ring 12a of the second ball bearing 12 are respectively fixed to bearing fitting portions 3a and 8b of the casing 3 and the casing cover 8 by an adhesive.

A spacer 13, which can adjust the spring pressure of the compression spring member 14 by changing its axial dimension by a small amount, is arranged between one end of the compression spring member 14 and the inner ring 12b of the second ball bearing 12. A second compression spring member 18 is arranged between the flange portion 10c of the output shaft 10 and an inner ring 11b of the first ball bearing 11, and generates a spring pressure at least smaller than the spring pressure of the compression spring member 14. The second compression spring member 18 applies a pre-load to the inner ring 11b of the first ball bearing 11.

Note that a difference between the spring pressures generated by the compression spring members 14 and 18 is applied to the second ball bearing 12 as a pre-load, so as to allow smooth rotation of the output shaft 10 without cluttering. The compression force of the movable member 7 with respect to the contact surface of the vibration member 2 is a difference between the spring pressures generated by the compression spring members 14 and 18.

A flexible printed board 19 is adhered to the electrode surface of the piezo-electric element 1, and is fixed to the casing 3 through a spacer 20 via a notched portion of the casing cover 8. A reinforcing plate 21 is fixed to the flexible printed board, and a connector 22 is fixed to the reinforcing plate.

The arrangement of the high-precision type vibration driven motor has been described. In FIG. 3, a laser rotary encoder 51, having a resolution of 81,000 PPR, for controlling rotation of the vibration driven motor with high precision is fixed to the vibration driven motor through a micro coupling 52 and a longitudinal cylinder 53 formed of a material having a vibration damping function. More specifically, the laser rotary encoder 51, which is fitted in a fitting portion of the longitudinal cylinder 53, and is fixed by a screw 54, is held by a fitting portion of the casing cover 8 and a screw 55 to be concentrical with the vibration driven motor, and the rotation of the vibration driven motor is transmitted to the laser rotary encoder via the coupling 52, which has sufficient rigidity, and is fixed to the other end of the output shaft and the input shaft of the laser rotary encoder 51 respectively by the fitting portion and a screw 56.

Note that the vibration driven motor vibrates at a high frequency of about 30 kHz, and in order to prevent the small vibration amplitude from being transmitted to the encoder, the longitudinal cylinder 53 must be formed of a metal composite material, a plastic material, or a rubber-based material having a vibration damping function, or, for example, a vibration damper having a vibration damping function must be used between the casing cover and a metal longitudinal cylinder.

A conventional stator and the stator of the present invention separately were assembled with a vibration driven motor with the above-mentioned arrangement, and rotation precision was evaluated under the following conditions.
(Target precision): a wow & flutter value of 0.03% (RMS value) or less at a frequency of 500 Hz or less
(Rated Values): a rotation speed of 33.33 rpm (CW and CCW directions), and a load of 1 kg·cm
(Encoder): the laser rotary encoder (81,000 PPR) was fixed to the other end of the output shaft of the vibration driven motor, and rotation control was made using all pulses.
(Measurement): a signal detected by the rotation control laser rotary encoder was input to a wide-band flutter meter.

Note that the principal specifications of a 9-wave type vibration driven motor used for a comparative evaluation are summarized in Table 1 below.

TABLE 1

Figure 4A:
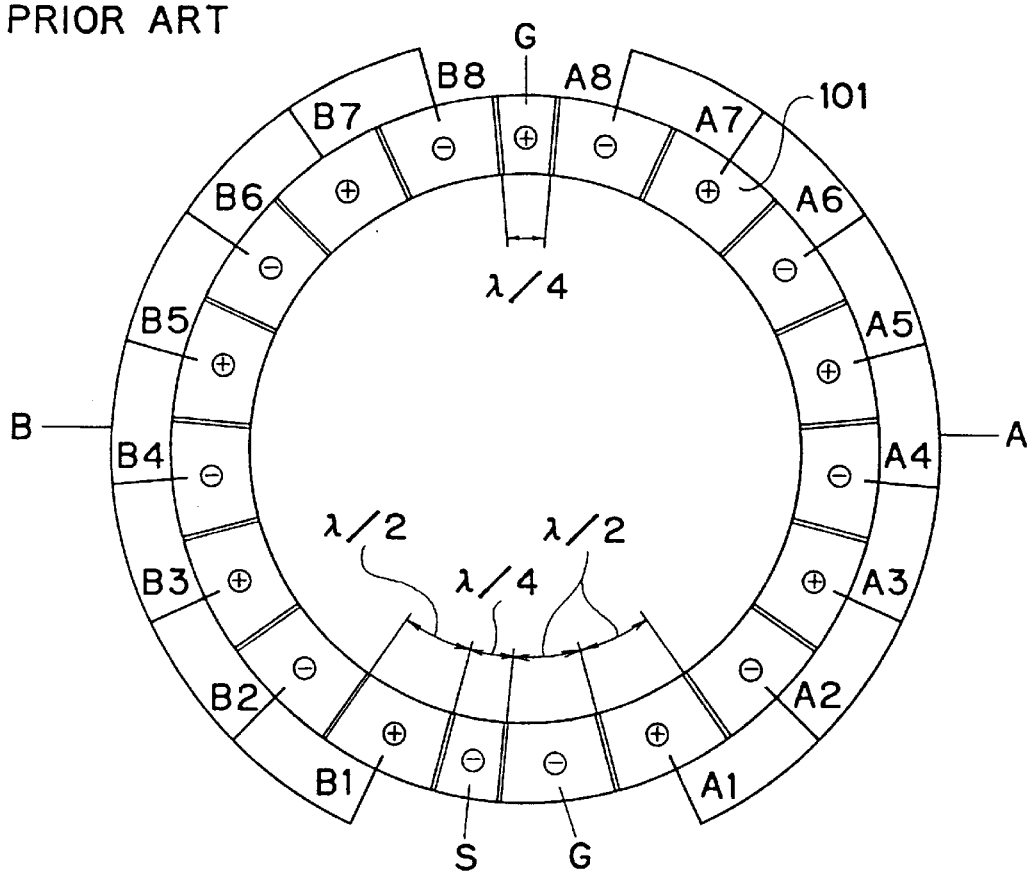
FIGS. 4A and 4B are respectively a plan view showing an electrode arrangement of a piezo-electric element of a conventional vibration driven motor, and an exploded side view on a vibration member.
Figure 4B:
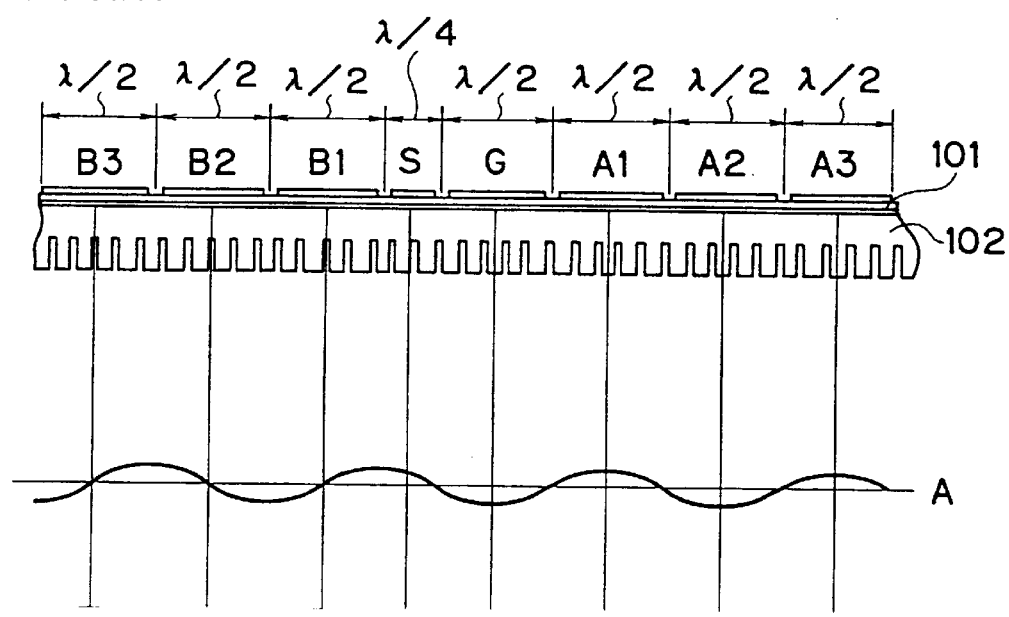

| | Comparative Example (FIG. 4) | Embodiment (FIG. 1) |
|---|---|---|
| Material and Size of Piezo-electric Element | N-61 (manufactured by TOHKIN Co.) $\phi73 \times \phi57 \times 0.5t$ (mm) | |
| Material and Size of Vibration Member | SUS420J2, total height = 6.5, slit width 1 × depth 3.5 (mm) | |
| Harden-treated Film | WC-CO (12 Wt %), spray-coated | |

TABLE 1-continued

| | Comparative Example (FIG. 4) | Embodiment (FIG. 1) |
|---|---|---|
| of Vibration Member | film (Hv = 1,200) | |
| Flatness of Projection Portions of Vibration Member | 1 µm or less | |
| Material and Size of Slide Member | non-thermoplastic P1 + glassy carbon (30 Wt %), $\phi68 \times \phi64 \times 1t$ | |
| Electrode Arrangement of Piezo-electric Element | one vibration detection electrode | two vibration detection electrodes |
| Number of Projections of Vibration Member | 5 per $\lambda/2$ | 4 per $\lambda/2$ |
| Positional Relationship between Electrodes of Piezo-electric Element and Vibration Member | Not specified | Specified |

First, the vibration driven motor shown in FIG. 3 was assembled with a conventional stator, a brake having a load of 1 kg·cm was fixed to the output shaft, a laser rotary encoder having a resolution of 81,000 PPR was fixed to the other end of the output shaft through a coupling, and the vibration driven motor was rotated in the CW (clockwise) direction at a rotation speed of 33.33 rpm. After a warm-up operation for 24 hours, a signal output from the encoder was input to a flutter meter to measure a flutter value at a cutoff frequency of 500 Hz. As a result, the flutter value was about 0.5% in an RMS value, and was considerably larger than the target precision.

Then, the stator of this embodiment was assembled in a vibration driven motor having the same arrangement, and the movable member was replaced with a new one. A brake and an encoder were fixed to the vibration driven motor as in the prior art, and the vibration driven motor was rotated in the CW direction at a rotation speed of 33.33 rpm using the driving circuit shown in FIG. 2. After a warm-up operation for 24 hours, a flutter value at a cutoff frequency of 500 Hz was about 0.04% in an RMS value. Although the target precision could not be obtained, it was confirmed that the flutter value was ¹⁄₁₀ or less that of the prior art, and was remarkably improved. It was also confirmed that a flutter value in the CCW (counterclockwise) direction was similarly improved. In addition, driving efficiency was improved by 5% or more.

As described above, according to the present invention, a technique for obtaining an ideal vibration state of a progressive vibration wave by two detection electrodes of an electromechanical energy conversion element such as a piezo-electric element and its electrode arrangement, and a technique for setting the number of projections per $\lambda/2$ of a vibration member to be an integer multiple of 2 (i.e., 2:4:6:8 . . . ) are combined, and the piezo-electric element and the vibration member are fixed while the relationship between the electrode arrangement of the piezo-electric element and the positions of the projections of the vibration member are specified, thus obtaining an optimal stator in principle, which has dimensional symmetry.

As a result, the rotation precision of the vibration driven motor can be remarkably improved, and a variation in rotation precision depending on rotation directions can be eliminated.

In addition, driving efficiency can also be improved, and a difference among individual vibration driven motors themselves can also be eliminated.

What is claimed is:

1. A vibration device comprising:

a vibration member having a plurality of projections arranged for contacting a contact member, wherein each of said plurality of projections is substantially the same, and said plurality of projections are arranged at equal intervals;

first and second electromechanical energy conversion members for generating vibration in said vibration member in response to applied electrical signals, said first and second electromechanical energy conversion members being arranged on said vibration member with a spacial phase difference therebetween, such that each of said first and second electromechanical energy conversion members generates a respective standing wave vibration in said vibration member; and first and second detection members for detecting a vibration state of said vibration member, a spatial central position of each of said first and second detection members coinciding with a center position of a respective slit formed between adjacent projections of said plurality of projections.

2. A device according to claim 1, wherein each of said first and second conversion members includes a piezo-electric element.

3. A device according to claim 1, wherein a material of said vibration member includes martensite-based stainless steel.

4. A driving system comprising a vibration device, the vibration device comprising:

a vibration member having a plurality of projections arranged for contacting a contact member, wherein each of said plurality of projections is substantially the same, and said plurality of projections are arranged at equal intervals;

first and second electromechanical energy conversion members for generating vibration in said vibration member in response to applied electrical signals, said first and second electromechanical energy conversion members being arranged on said vibration member with a spacial phase difference therebetween, such that each of said first and second electro-mechanical energy conversion members generates a respective standing wave vibration in said vibration member; and first and second detection members for detecting a vibration state of said vibration member, a spatial central position of each of said first and second detection members coinciding with a center position of a respective slit formed between adjacent projections of said plurality of projections.

5. A vibration device comprising:

a vibration member having a plurality of projections defined by a respective plurality of grooves formed at equal intervals in a contact surface thereof, each of said plurality of grooves being substantially the same;

first and second electro-mechanical energy conversion members for generating vibration in said vibration member in response to applied signals, said first and second electromechanical energy conversion members being arranged on said vibration member with a spacial phase difference therebetween, such that each of said first and second electromechanical energy conversion members generates a respective standing wave vibration in said vibration member; and first and second detection members for detecting a vibration state of said vibration member, a spatial central position of each of said first and second detection members substantially coinciding with a center position of a respective groove formed between adjacent projections of said plurality of projections.

* * * * *

UNITED STATES PATENT AND TRADEMARK OFFICE
CERTIFICATE OF CORRECTION

PATENT NO.    : 6,175,181 B1
DATED         : January 16, 2001
INVENTOR(S)   : Takayuki Shirasaki It is certified that error appears in the above-identified patent and that said Letters Patent is hereby corrected as shown below:

Title page,
Item [56] References Cited

U.S. PATENT DOCUMENTS
"Kataska" should read -- Kataoka --.

Sheet 2,
Figure 2, "HASE" (both occurrence) should read -- PHASE --; and
          "ATION" should read -- VIBRATION --.

Column 1,
Line 11, "electromechanical" should read -- electro-mechanical --.

Column 4,
Line 9, "concentrical" should read -- concentric --.

Column 5,
Line 23, "concentrical" should read -- concentric --.

Column 6,
Line 51, "electromechanical" should read -- electro-mechanical --.

Column 7,
Line 8, "electromechanical" should read -- electro-mechanical --.
Line 11, "electromechanical" should read -- electro-mechanical --.
Line 14, "electromechanical" should read -- electro-mechanical --.
Line 36, "electromechanical" should read -- electro-mechanical --.

UNITED STATES PATENT AND TRADEMARK OFFICE
CERTIFICATE OF CORRECTION

PATENT NO. : 6,175,181 B1
DATED : January 16, 2001
INVENTOR(S) : Takayuki Shirasaki It is certified that error appears in the above-identified patent and that said Letters Patent is hereby corrected as shown below:

Column 8,
Line 2, "electromechanical" should read -- electro-mechanical --.
Line 24, "electromechanical" should read -- electro-mechanical --.
Line 27, "electromechanical" should read -- electro-mechanical --.

Signed and Sealed this

Thirtieth Day of October, 2001

Attest:

*Nicholas P. Godici*

NICHOLAS P. GODICI
*Attesting Officer*       *Acting Director of the United States Patent and Trademark Office*